(12) United States Patent
Morgan

(10) Patent No.: US 6,401,585 B1
(45) Date of Patent: Jun. 11, 2002

(54) DOUBLE CUTTING EDGED SAW BLADE FOR HAND-HELD RECIPROCATING POWER SAWS

(76) Inventor: John E. Morgan, P.O. Box 2310, Albany, OR (US) 97321

( * ) Notice: Subject to any disclaimer, the term of this patent is extended or adjusted under 35 U.S.C. 154(b) by 0 days.

(21) Appl. No.: 09/523,037

(22) Filed: Mar. 10, 2000

(51) Int. Cl.[7] .............................................. B27B 33/02
(52) U.S. Cl. ........................................... 83/835; 30/501
(58) Field of Search ........................ 30/353, 501, 502, 30/503, 503.5, 505, 355; 83/835, 697

(56) References Cited

U.S. PATENT DOCUMENTS

| | | | |
|---|---|---|---|
| 242,951 A | * | 6/1881 | Marvin |
| 807,227 A | * | 12/1905 | Wuest |
| 1,335,659 A | * | 3/1920 | Collins |
| 3,033,251 A | * | 5/1962 | Atkinson |
| 3,180,005 A | * | 4/1965 | Oxford |
| 3,680,610 A | | 8/1972 | Lindgren .................. 143/133 J |
| 3,837,024 A | | 9/1974 | Saunders ..................... 7/8.1 R |
| 3,946,778 A | * | 3/1976 | Knuth |
| 3,977,289 A | * | 8/1976 | Tuke |
| 5,517,889 A | | 5/1996 | Logan .......................... 83/835 |
| 5,901,451 A | | 5/1999 | Nakayama .................... 30/502 |
| 5,918,525 A | | 7/1999 | Schramm ..................... 83/835 |
| 6,145,426 A | * | 11/2000 | Ward et al. |

* cited by examiner

*Primary Examiner*—Kenneth E. Peterson
(74) *Attorney, Agent, or Firm*—Klarquist Sparkman LLP

(57) ABSTRACT

A saw blade for in-line reciprocating hand-held power saws has first and second types of cutting teeth adapted to cut materials of disparate hardness disposed on its first and second oppositely disposed cutting edges. Saw blades according to the invention are fabricated in a die having first and second longitudinally oriented sections. Band saw blade material having a back edge and a factory cutting edge having teeth adapted to cut a first type of material is placed in the die. When closed under pressure, the first die section cuts the back edge of the band saw blade material in the desired second edge of the saw blade. The second die section cuts a desired type of cutting teeth on a previously shaped second cutting edge of a blade. A power saw equipped with the saw blade cuts a first component of material having a first hardness using the first cutting edge of a blade. Reversing the saw or alternately reversing the blade in the chuck of the saw orients the blade in a desired manner to cut a second component of material having a second hardness.

4 Claims, 2 Drawing Sheets

DOUBLE CUTTING EDGED SAW BLADE FOR HAND-HELD RECIPROCATING POWER SAWS

FIELD OF THE INVENTION

This invention relates to saw blades for in-line reciprocating hand-held power saws, and more particularly, to such saws useful in demolition work.

BACKGROUND OF THE INVENTION

Hand held power saws of the reciprocating blade type are used for a variety of tasks. One such task is that of demolition. A power saw of this type is made and sold by Milwaukee Electric Tool Corporation, Brookfield, Wisconsin, under the trademark Sawzall®. Other companies make and sell similar power saws.

The demolition saw blades presently available for use with these power saws, however, are typically provided with cutting teeth on only one longitudinally oriented edge. Thus, if a workman must cut through material comprising components of disparate hardness, for example, wood having embedded nails, the saw blade must be changed or it is likely to break.

Accordingly, it is the primary object of the present invention to provide a saw blade for use in in-line reciprocating hand-held power saws of the Sawzall® type that will be suitable for cutting through material comprising components of disparate hardness.

It is a further object of the present invention to provide such a saw blade that will have cutting edges comprising cutting teeth adapted to cut through materials of disparate hardness, the teeth being disposed on the opposed longitudinally oriented edges of the main body portion of the saw blade.

It is a still further object of the invention to provide a method of cutting through material comprising components of disparate hardness using an in-line reciprocating hand-held power saw of the Sawzall® type.

It is a further object of the invention to provide a method of making a replaceable saw blade of the above-described type.

SUMMARY OF THE INVENTION

My saw blade comprises a main body portion and a symmetrical mounting portion or shank attached to the proximal end of the main body portion. The shank comprises an aperture disposed on the longitudinal axis of the blade such that the mounting portion can be reversibly received in the chuck of the power saw. The main body portion comprises oppositely disposed generally longitudinally oriented first and second cutting edges that comprise cutting teeth adapted to cut first and second materials of disparate hardness.

My method of cutting through material having first and second components of disparate hardness comprises providing a portable in-line reciprocating power saw having a chuck adapted to reversibly mount a replaceable cutting saw blade. I further provide a saw blade adapted to be received in the chuck. The saw blade has oppositely disposed first and second cutting edges. The cutting edges comprise, respectively, first and second cutting teeth adapted to cut the first and second components of the material. The method further comprises mounting the saw blade in the chuck with the first cutting edge oriented in a manner to cut through the first component of the material and cutting the first component using the teeth of the first cutting edge. The method further comprises cutting the second component of the material using the teeth of the second cutting edge.

The saw blade can be reversed in the chuck to orient the second cutting edge in a manner to cut through the second component of the material. Alternatively, the power saw can be reversed to orient the second cutting edge in a manner to cut through the second component of the material.

My method of making the replaceable saw blade comprises providing a length of band saw blade material comprising a back edge and a cutting edge. The cutting edge includes first cutting teeth adapted to cut a first component of material having a first hardness.

The method further comprises providing a die having a pair of longitudinally oriented sections. The first one of such sections is adapted to cut the back edge of the band saw blade material in the shape of the second cutting edge of a saw blade. The second one of such longitudinally oriented die sections is adapted to cut the desired type of cutting teeth on a shaped second cutting edge of a saw blade, said cutting teeth being adapted to cut a second component of material having a second hardness. The method further comprises placing the length of band saw blade material in the die and closing the die under pressure. The first one of the die sections cuts the back edge of the length of band saw blade material in the desired shape of the second cutting edge of a first saw blade. Simultaneously, the second one of the die sections cuts cutting teeth of a desired type on the previously shaped second cutting edge of a forwardly disposed saw blade.

The length of band saw blade material is then advanced a distance in the die equal to the length of a saw blade and the die is closed under pressure again.

DETAILED DESCRIPTION

Figure 1:
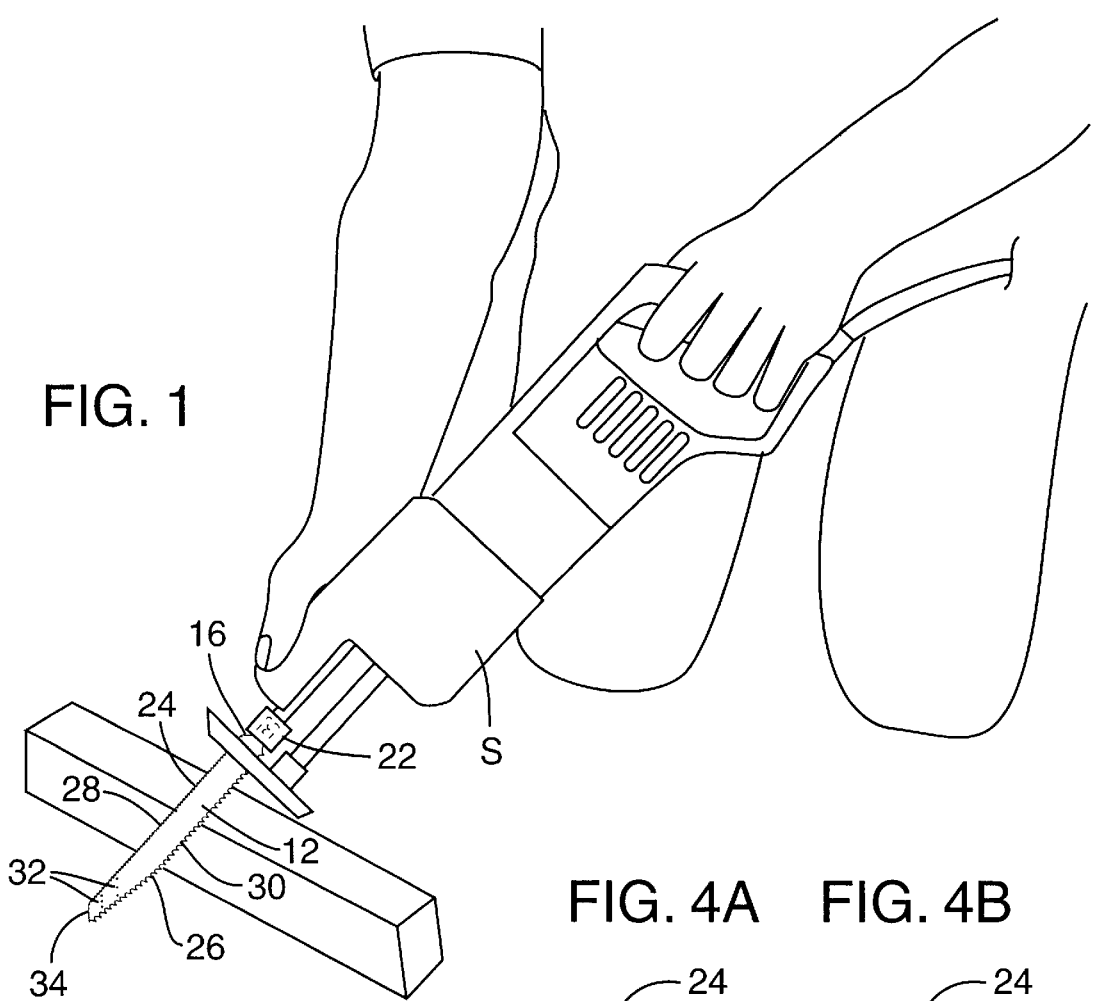
FIG. 1 is a perspective view of a workman using an in-line reciprocating hand-held power saw equipped with a double edged saw blade according to the present invention.
Figure 2:
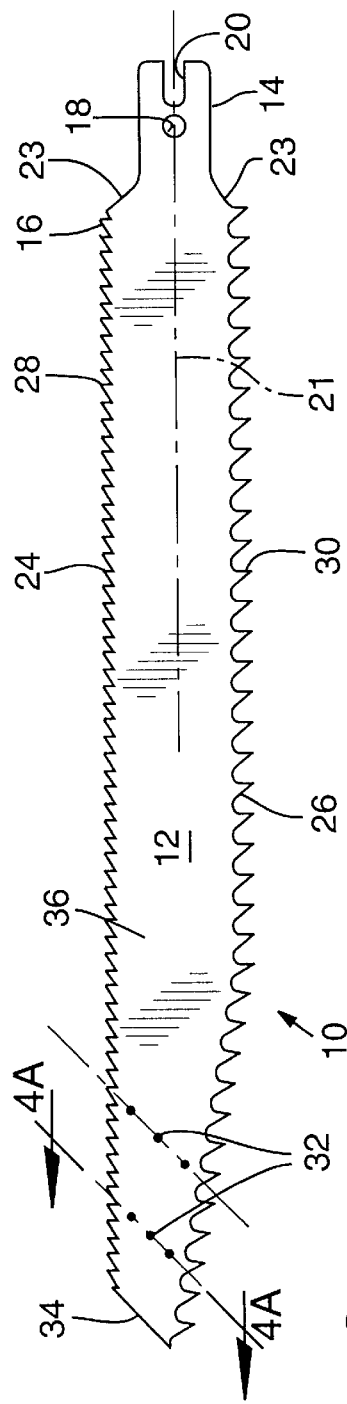
FIG. 2 is a side view of the saw blade itself to a larger scale.

Referring to the drawings and particularly to FIGS. 1 and 2, the replaceable saw blade 10 of the present invention has a main body portion 12. Body portion 12 comprises a symmetrical mounting portion or shank 14 at its proximal end 16. Shank 14 is provided with an aperture 18 and a slot 20, both disposed on the centerline 21 of body portion 12. Aperture 18 and slot 20 permit blade 10 to be reversibly received in the chuck 22 of a conventional portable in-line reciprocating hand-held power saw S for reciprocal cutting motion parallel to the longitudinal axis of the saw. Saw S may be, for example, a Sawzall® power saw that is typically used in demolition work.

The symmetrical configuration of shank 14 and the location of aperture 18 and slot 20 on centerline 21 provide good transverse stabilization of blade 10 with respect to the conventional centering pin (not shown) typically provided in chuck 22. Such allows the reversal of blade 10 in chuck 22 with no diminution of transverse stabilization.

As shown in FIG. 2, main body portion 12 tapers transversely inwardly toward shank 14 along tapering portions 23. This minimizes the possibility of creating stress concentrations at the juncture of body portion 12 and shank 14. Demolition blades typically break at this juncture.

Main body portion 12 comprises oppositely disposed, generally longitudinally oriented first and second cutting edges 24, 26 that themselves comprise first and second cutting teeth 28, 30. Teeth 28 comprise teeth adapted to cut one type of material, for example metal, while teeth 30 comprise teeth adapted to cut another type of material, for example, wood. Obviously, wood and nails are materials of greatly disparate hardness.

Figure 3:
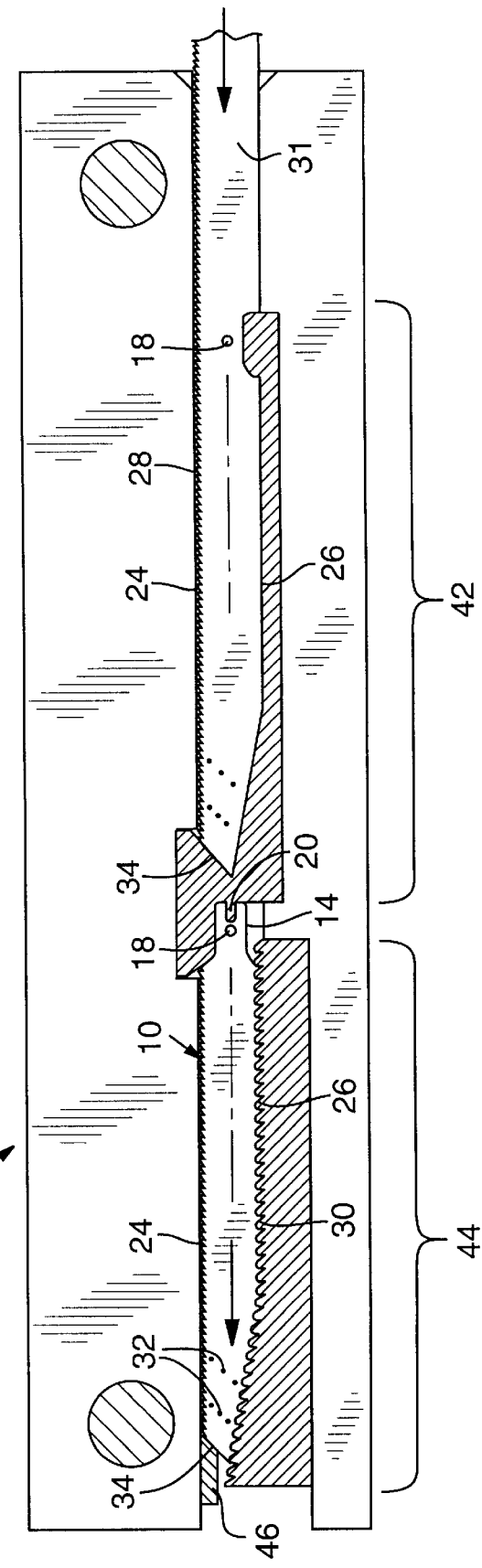
FIG. 3 is a plan view, partly in section, of a die useful in my method of making the saw blade of FIG. 2.

Saw blade 10 is preferably fabricated of rolled, tempered Sandvik® brand band saw blade material 31 (see FIG. 3) having preformed teeth 28 on side 24. It should be understood, of course, that teeth 28 could be on side 26 and teeth 30 could be on side 24. The band saw blade material 31 can be obtained, for example from Manufacturers Tool Service, Inc., Clackamas, Oreg. 97015. The material is preferably 0.042 inch thick. It is 1.25 inch wide in the case of demolition blades twelve inches long, and one inch wide for blades six inches long. The material is preferably a fully heat tempered carbon steel having a carbon content of between about seven and seven and one-half percent and a hardness of between about 65 and 67 Rockwell. This is in contradistinction to typical Sawzall® power saw blades wherein just the cutting edge is tempered. As shown in FIG. 3 and hereinabove noted, band saw blade material 31 may be initially fabricated with a cutting edge (the "factory edge") having relatively fine teeth 28 for cutting metal, for example, nails. The opposite edge (the "back edge") is the edge 26 on which I provide the teeth 30 for cutting the different material, for example, wood.

As shown in FIG. 2, I provide depth gauges in the form of three dimples 32 on opposite sides of body portion 12 parallel to and at selected distances from the distal end 34. Distal end 34 is typically cut at a 45° angle with respect to centerline 21. Preferably, I place one line of dimples 32 three-quarters inch from distal end 34 and parallel thereto, and a second line of dimples 32 one and three-quarters inches from end 34. The three dimples show up as a 45° indicator when the saw is being used. They allow the operator to see how deep he is cutting.

Figures 4A, 4B:
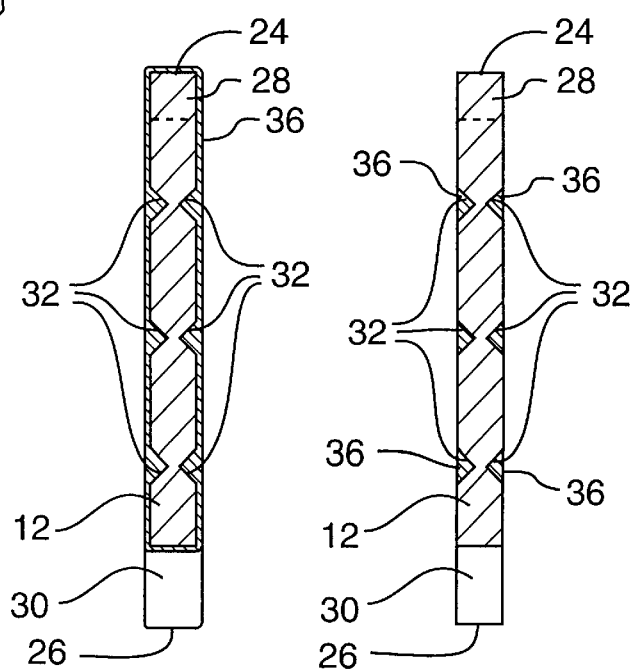
FIG. 4A is a sectional view taken on line 4—4 of FIG. 2.
FIG. 4B is a sectional view similar to FIG. 4A after the saw blade of the invention has been used for a period of time.

Preferably, I coat saw blade 10 with a high reflective paint 36 which is useful when cutting in low light conditions which often occur during demolition work. FIG. 4A illustrates the layer of paint 36 when the saw blade 10 is new. Paint 36, however, quickly wears off as blade 10 is being used, except in dimples 32, where the paint 36 continues to remain visible so as to function as a depth gauge. See FIG. 4B. A preferred paint is Benjamin Moore & Co. Industrial Maintenance Coating, "Safety Yellow 15", obtainable from Benjamin Moore & Co., Montvale, N.J. 07645.

METHOD OF USE

My method of using my saw blade 10 comprises mounting blade 10 in the chuck 22 of a saw S with one of the cutting edges, which may be edge 26, oriented in a manner to enable the operator to cut wood. After the saw is used to cut to a desired depth and upon reaching some embedded metal, for example, some nails, the saw S is reversed to enable the teeth 28 on edge 24 to cut through any metal that might be present. Alternatively, and if preferred under the circumstances, the saw blade 10 may itself be reversed in chuck 22 to enable teeth 28 to cut through the nails, leaving the attitude of the saw S unchanged.

METHOD OF MAKING THE SAW BLADE

My method of making saw blades 10 comprises providing a length of band saw blade material 31 that is itself fabricated with a cutting edge 24 (the "factory edge") having teeth 28 adapted, for example, for cutting metal. The opposite edge of band saw blade material 31 (the "back edge") is the edge 26 on which I provide the teeth 30 for cutting the other material, for example, wood.

I provide a die 40 having first and second longitudinally oriented sections 42, 44. First section 42 is shaped to cut the back edge of band saw blade material 31 in the shape of edge 26. Second section 44 is adapted to cut the teeth 30 on a previously shaped edge 26.

I place the length of band saw blade material 31 in the die 40 and then close the die under the required pressure. The first die section 42 cuts the back edge of band saw blade material 31 in the desired shape of edge 26. I then advance the length of band saw blade material 31 to a stop 46, a distance about equal to the length of blade 10. Closing the die 40 again under pressure causes second section 44 to cut the teeth 30 on the previously shaped back edge 26, while section 42 cuts the back edge 26 for a successor saw blade 10. Repeating the advancing and closing steps continuously forms a succession of saw blades 10.

It will, of course, be understood that various changes may be made in the form and details and in the arrangement and proportions of parts without departing from the scope of the invention as defined in the appended claims.

I claim:

1. A replaceable saw blade for use in a portable in-line reciprocating power saw having a chuck adapted to mount the blade for reciprocal movement parallel to its longitudinal axis, the saw blade comprising:

a main body portion; and a symmetrical mounting portion attached to the proximal end of the main body portion, the mounting portion comprising a slot disposed on the longitudinal axis of the saw blade and extending inwardly from the proximal end, the mounting portion further comprising an aperture disposed on the longitudinal axis of the saw blade, distally away from the slot, whereby the mounting portion is adapted to being reversibly received in and secured to the chuck of the power saw;

the main body portion comprising oppositely disposed generally longitudinally oriented first and second cutting edges, the first and second cutting edges each comprising cutting teeth, the cutting teeth on the first cutting edge comprising teeth of a different configuration from the cutting teeth on the second cutting edge, the cutting teeth on the first and second cutting edges being adapted to cut first and second materials of disparate hardness;

the main body portion further comprising a plurality of depth gauges disposed on opposite sides of the main body portion at selected distances from the distal end of the main body portion;

the depth gauges comprising a plurality of dimples disposed in the opposite sides of the main body portion, the dimples comprising at least one subset of dimples extending transversely of the main body portion in a direction parallel to the distal end of the saw blade;

the dimples each comprising a depression no part of which extends beyond the plane of the main body portion, whereby paint applied to the main body portion is adapted to being worn off during use except in the dimples.

2. The replaceable saw blade of claim 1, wherein the main body portion comprises heat tempered carbon steel comprising between about 7 and 7½ percent carbon.

3. The replaceable saw blade of claim 2, wherein the main portion is tempered to a hardness of between about 65 and 67 Rockwell.

4. The replaceable saw blade of claim 1, wherein the main body portion tapers inwardly to the mounting portion to minimize stress concentration.

* * * * *